(12) United States Patent
Klimov

(10) Patent No.: US 11,681,621 B2
(45) Date of Patent: Jun. 20, 2023

(54) METHOD AND APPARATUS FOR CHANGING ADDRESS-TO-ROW MAPPINGS IN A SKEWED-ASSOCIATIVE CACHE

(71) Applicant: Arm Limited, Cambridge (GB)

(72) Inventor: Alexander Klimov, Hadera (IL)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/471,406

(22) Filed: Sep. 10, 2021

(65) Prior Publication Data
US 2023/0079210 A1 Mar. 16, 2023

(51) Int. Cl.
*G06F 12/0811* (2016.01)
*G06F 12/0877* (2016.01)
*G06F 12/0817* (2016.01)

(52) U.S. Cl.
CPC ........ *G06F 12/0811* (2013.01); *G06F 12/082* (2013.01); *G06F 12/0877* (2013.01)

(58) Field of Classification Search
CPC . G06F 12/0811; G06F 12/082; G06F 12/0877
USPC .......................................................... 711/118
See application file for complete search history.

(56) References Cited

U.S. PATENT DOCUMENTS

| | | | | |
|---|---|---|---|---|
| 2020/0133862 A1* | 4/2020 | Rangarajan | ......... | G06F 12/0846 |
| 2020/0341901 A1* | 10/2020 | Sandberg | ................ | H04L 9/003 |
| 2022/0200783 A1* | 6/2022 | Unterluggauer | ...... | H04L 9/0618 |

OTHER PUBLICATIONS

Qureshi, Moinuddin, "CEASER: Mitigating Conflict-Based Cache Attacks via Encrypted-Address and Remapping," https://memlab.ece.gatech.edu/papers/MICRO_2018_2.pdf, 2018, 775-787.
Seznec, André, "A case for two-way skewed-associative caches", Proceedings of the 20th annual international symposium on computer architecture (ISCA '93), Association for Computing Machinery, New York, NY, USA, 1993, 169-178, https://dl.acm.org/doi/abs/101145/165123.165152.
Schwedock et al., "Jumanji: The Case for Dynamic NUCA in the Datacenter," 2020 53rd Annual IEEE/ACM International Symposium on Microarchitecture (MICRO), 2020, pp. 665-680, https://www.cs.cmu.edu/~beckmann/publications/papers/2020.micro.jumanji.pdf.
Beckmann et al., "Jigsaw: Scalable software-defined caches," Proceedings of the 22nd International Conference on Parallel Architectures and Compilation Techniques, 2013, pp. 213-224, https://people.csail.mit.edu/sanchez/papers/2013.jigsaw.pact.pdf.
Beckmann, Nathan, "Design and Analysis of Spatially-Partitioned Shared Caches", PhD Thesis, Department of Electrical Engineering and Computer Science, Massachusetts Institute of Technology, Sep. 2015, https://www.cs.cmu.edu/~beckmann/publications/phd_thesis.pdf, Section 3.2.2.
Thoma et al., "CLEPSYDRACACHE—Preventing Cache Attacks with Time-Based Evictions," arXiv:2104.11469v1 [cs.CR] Apr. 23, 2021.

* cited by examiner

*Primary Examiner* — Gautam Sain
*Assistant Examiner* — Wei Ma
(74) *Attorney, Agent, or Firm* — Leveque Intellectual Property Law, P.C.

(57) ABSTRACT

Systems, devices and methods are provided for operating a skewed-associative cache in a data processing system and, in particular, for changing address-to-row mappings in a skewed-associative cache.

17 Claims, 7 Drawing Sheets

METHOD AND APPARATUS FOR CHANGING ADDRESS-TO-ROW MAPPINGS IN A SKEWED-ASSOCIATIVE CACHE

BACKGROUND

The present disclosure relates to computer systems. More particularly, the present disclosure relates to a skewed-associative cache in a data processing system.

A data processing system may use one of more high-speed caches between a processor and memory to enable the processor to access data faster. In a skewed-associative cache of a data processing system, a base address in a memory is mapped to a block in each column of the cache using an address-to-row mapping that is different for each column. Data may be stored in any one of the columns.

A conventional W-way set-associative cache may be represented as an array with R rows (also known as "sets") and W columns (also known as "ways") of cache blocks (also known as "cache lines"). A memory block with address A is mapped to a row F(A) and can be stored in any column of that row. Usually, the address-to-row mapping F(A) is static and very simple. For example, mapping F may select some bits of the address A.

A skewed-associative cache uses W different functions $F_i$ to map a single address A into different rows. The address A is mapped to rows $F_0(A), \ldots, F_{W-1}(A)$ in columns $0, \ldots, W-1$, respectively. Thus, addresses A and B that were mapped to the same row in column i (i.e., $F_i(A)=F_i(B)$), are not usually mapped to the same row in different columns, i.e., in most cases $F_j(A) \neq F_j(B)$ for $i \neq j$.

A cache can be the target of a security attack on a data processing system. For example, in a "row hammer" attack, an attacker can repeatedly access some address in memory by ensuring that this address is evicted from cache. Another example of an attack is a "prime-and-probe" attack. In a "prime" phase, an attacker process fills a section of interest in the cache with its data. Subsequently, the victim process evicts some of the attacker's cache entries upon memory access. In the "probe" phase, the attacker measures the access time for reading the data placed during the "prime" phase and detects which entries were evicted by the victim. Other forms of attacks are known.

Modern secure cache designs mitigate attacks by randomizing the mappings on each boot of the system. Additional approaches may be used. For example, time-to-live-based eviction of entries in the cache makes conflict-based evictions indistinguishable from time-based evictions. However, these approaches do not provide full protection.

BRIEF DESCRIPTION OF THE DRAWINGS

The accompanying drawings provide visual representations which will be used to describe various representative embodiments more fully and can be used by those skilled in the art to better understand the representative embodiments disclosed and their inherent advantages. In these drawings, like reference numerals identify corresponding or analogous elements.

DETAILED DESCRIPTION

Figure 1:
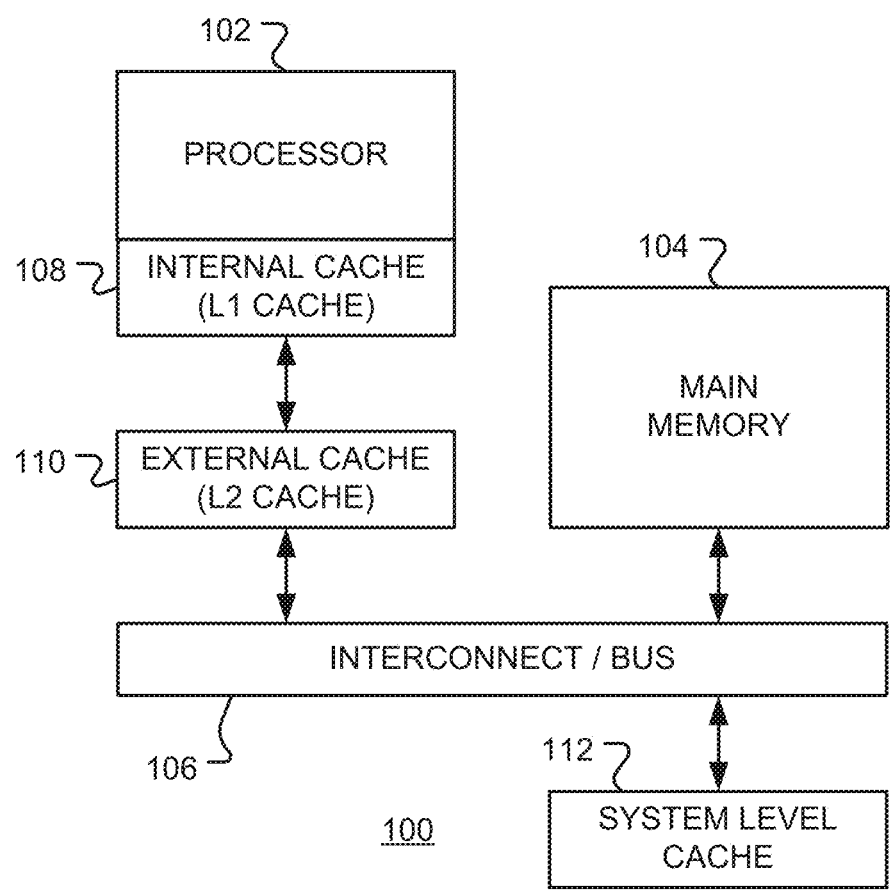
FIG. 1 is a block diagram of a data processing system, in accordance with various representative embodiments.

The various apparatus, devices and methods described herein provide mechanisms for operating a skewed-associative cache in a data processing system and, in particular, for changing address-to-row mappings in a skewed-associative cache.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

In accordance with the present disclosure, one or more address-to-row mapping(s) used in a skewed-associative cache is changed without interrupting operation of the cache. Changing the address-to-row mapping helps to protect the data processing system against cache attacks. To prepare a column of the cache for a mapping change, all dirty blocks in the column (i.e., blocks that were modified in cache and so have to be written back to memory) are moved to memory or to other blocks. In order to minimize the negative effects of the change on cache operations, cache operations are not halted while the column is prepared for the change.

To enable a mapping used in column i to be changed from $F_i$ to $F'_i$, each column of the cache is augmented with a bit $V_i$ that indicates a map version for the column. In addition, each block is augmented with a block map version bit that indicates the map version that was used to store data in the block. A column map version bit is flipped each time the address-to-row mapping is changed for that column. A block in column i is considered to be valid if its data validity bit is set and its map version bit is equal to $V_i$.

FIG. 1 is a simplified block diagram of a data processing system in accordance with various representative embodiments. Data processing system 100 includes processor 102 that operates on data stored in memory 104. In general, the data processing system may have one processor or multiple processors. The memory and processor are coupled by bus or other interconnect structure 106. For most memory technologies, the access time of memory 104 is long compared to the instruction cycle of processor 102, so one or more caches are used. The caches are higher speed, often smaller, memories that have shorter access times than memory 104. The caches are used to store temporary copies of data received from the memory or produced by a processor. In the embodiment shown in FIG. 1, the data processing system 100 includes level one (L1) cache 108 in the same chip as processor 102, level two (L2) cache 110 that may be shared by a cluster of processors, for example, and system level cache (SLC) 112 that may be shared by multiple processors or multiple processor clusters.

Generally, a cache is not large enough to store all of the data needed by a processor. When new data is to be moved into the cache, the cache controller must select which data to evict from the cache to make space for the new data. Data is moved in and out of the cache in blocks. A cache block includes a group of data bytes. For example, a cache block may be a group of 64 bytes. Associated with the data in a block is metadata including, for example, an address tag, a data state and the block map version.

When a processing core requests data associated with a given memory address, the cache checks if the data is in the cache. If not, an event referred to as a "cache miss" occurs and the data is read from the memory or a lower level cache. If the cache is already full, the cache must select one of the cache blocks to be removed from the cache to make space for the incoming data. The cache block selected for removal is called the "victim cache block." The act of removing the victim cache block is termed "eviction." The new data may be requested from memory 104, for example.

The performance improvement provided by cache depends on how many times the data moved into the cache are accessed before the cache block is evicted.

A variety of mechanisms have been developed to control how data is moved in and out of a cache. In a conventional set-associative cache, for example, the cache is represented as a number of columns or banks, with each column including a number of blocks. When data is moved into the cache from a base address A in a memory, the data may be stored in a block at row F(A) in any of the columns, where F is an address-to-row mapping function. The column may be selected in accordance with an eviction policy, for example. For a cache with W columns, there are W possible columns in which the data could be stored. Thus, the columns are also referred to as "ways" and the cache is referred to as a W-way cache.

Figure 2:
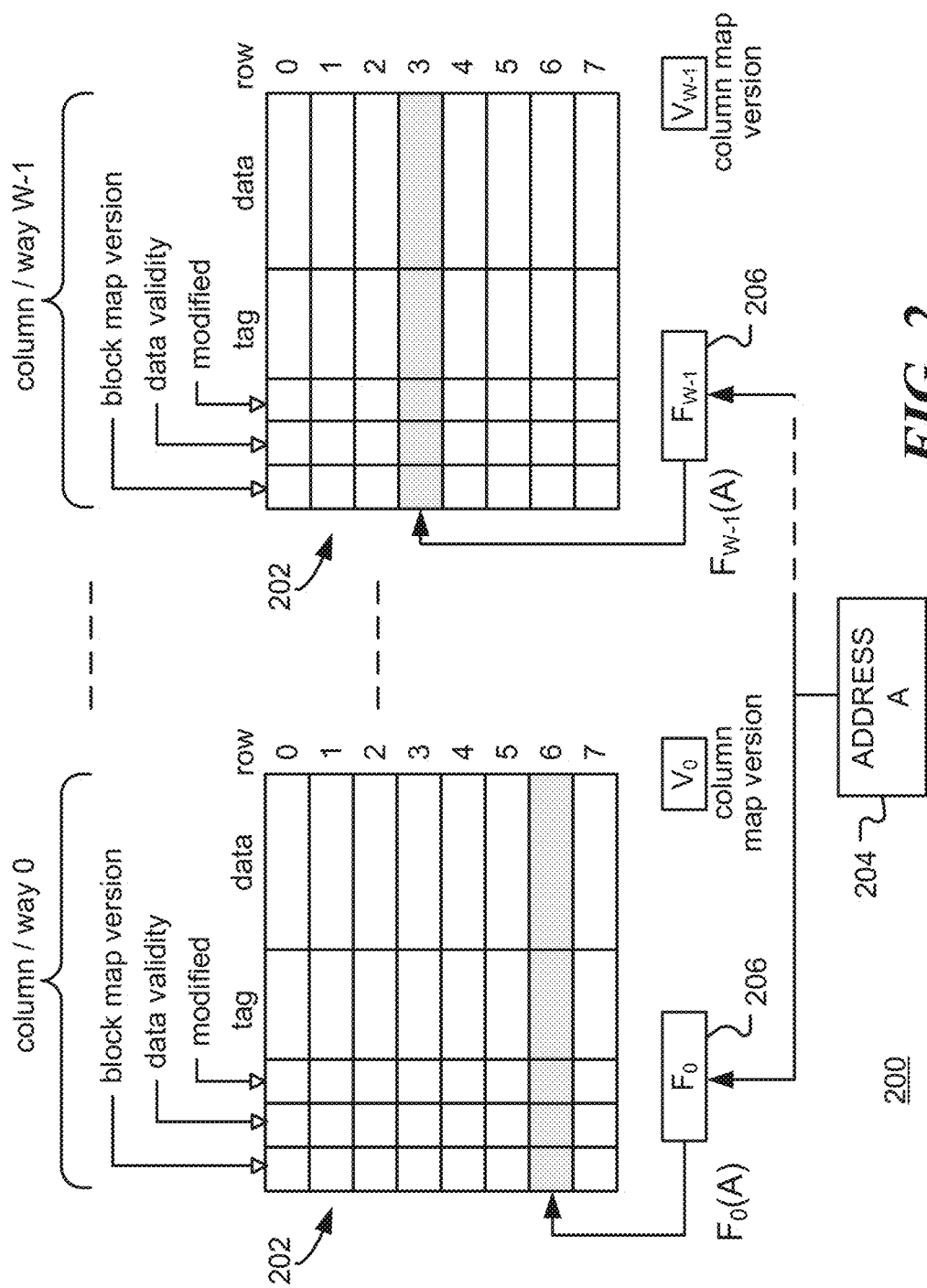
FIG. 2 is a simplified block diagram of a skewed-associative cache, in accordance with various representative embodiments.

FIG. 2 is a simplified block diagram of a skewed-associative cache 200 in accordance with various representative embodiments. Cache 200 is arranged, at least conceptually, as an array of blocks with a number of columns 202 and a number of rows. While there are eight rows and W columns in the simplified example shown, a practical cache may have many more rows. A block is referenced by its row location in a column.

Each block includes data and is associated with corresponding metadata. The metadata includes information about the data. In the example shown, the metadata includes a block map version, a data validity bit, a "modified" bit that indicates if the data has been modified, and an address tag. Data is said to be "modified" if it was written by processor and has not yet been written back to the memory. Accordingly, it may or may not match corresponding data in the memory. Taken together, the data validity bit and the "modified" bit indicate the state of the data (i.e., data state), which may be "invalid," "dirty" or "clean." The data state is "invalid" when the data in not valid (i.e., the cache block is not currently used), "clean" when the data in the block is valid and matches corresponding data in the memory, and "dirty" when the data in the block is valid but modified. In further embodiments, the metadata may also indicate whether the data is shared between multiple processors or is exclusive to a particular processor. The address tag indicates a base address in the memory. The data is associated with the address tag, in that the data has either been moved into the cache from that base address or may be written back to the memory at that base address at some future time.

Physically, the cache may have any arrangement. For example, the metadata and data may be stored in different physical arrays or in the same physical array.

In a skewed-associative cache, such as that shown in FIG. 2, the data from base address A may be stored in a block at row $F_0(A)$ in column 0, row $F_1(A)$ in column 1, row $F_2(A)$ in column 2, etc. Here, $F_i(A)$ denotes an address-to-row mapping function for column i. When data is moved into the cache from a base address A, a set of blocks in the cache is determined by a cache controller of the cache. The blocks are located at rows $F_0(A), F_1(A), \ldots, F_{W-1}(A)$ columns 0, 1, ..., W-1, respectively. That is, for each column i of the cache, the location $F_i(A)$ of a block in the column is determined dependent upon the address A. The data is stored in a selected block of the set of blocks. In contrast, is a conventional set-associative cache, the block set for an address A is a single complete row of the cache.

In the embodiment shown in FIG. 2, a base address A is mapped to row $F_i(A)$ in column i, where $F_i(A)$ is the address-to-row mapping for column i. In one embodiment, an address A is mapped to row $F(A, k_i)$ in column i, where $F(A, k_i)$ is function dependent upon of the address A and a key value $k_i$ for column i. In this embodiment, each column uses a different map value and the mapping may be changed by changing the key value. In FIG. 2, base address A (204) is mapped by mapping function $F_0$ to the block in row $F_0(A)$ in column 0. In the example shown, $F_0(A)=6$. Base address A (204) is also mapped, by mapping function $F_{W-1}$, to the block in row $F_{W-1}(A)$ in column W-1. In the example shown, $F_{W-1}(A)=3$.

In accordance with an embodiment of the disclosure, the mapping for a column may be changed during operation of the data processing system. As described above, in order to indicate if the location of block was selected based on a current mapping or a prior mapping, a column map version 206 is stored for each column of the cache and block map version is stored for each block in the cache. The location of the block is invalid if the block map version does not match the current column map version. Thus, for the data in a block to be considered valid, the block map version must match the current column map version and the validity bit must be asserted. The column map version is flipped whenever the mapping for that column is changed. Thus, a block that was valid before the mapping changed becomes invalid when the column map is changed because, for example, it may be at the wrong location in the column.

Figure 3:
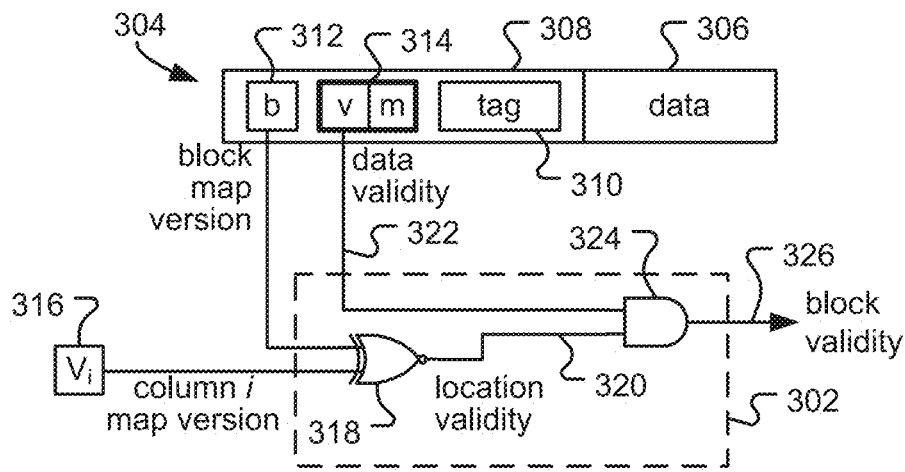
FIG. 3 is a block diagram of a logic circuit for determining if a cache block is valid or invalid, in accordance with various representative embodiments.

FIG. 3 is a block diagram of a logic circuit 302 for determining if a block 304 is valid (logic value 1) or invalid (logic value 0), in accordance with various embodiments. Block 304 includes data 306 and metadata 308. Metadata 308 includes address tag 310, block map version 312 and data state 314. In the example shown in FIG. 3, data state 314 includes a data validity bit (v) and a "modified" bit (m)

that together indicate if the data in the block is "invalid," "dirty" or "clean." The block map version 312 and the current column map version 316 are compared in XNOR gate 318 to determine location validity 320. Location validity 320 is then combined with data validity 322 in AND gate 324. If both location and data are valid, the block is valid and output 326 has logic value 1. Otherwise the block is invalid and output 326 has logic value zero.

When column and block map versions are used as described above, all blocks in a column are invalidated when the column map version is flipped. Before this is done, any "dirty" data in the column must be written back to cache or moved to another column, otherwise they would be lost. In addition, all block version bits should be set to the current block version.

Figure 4:
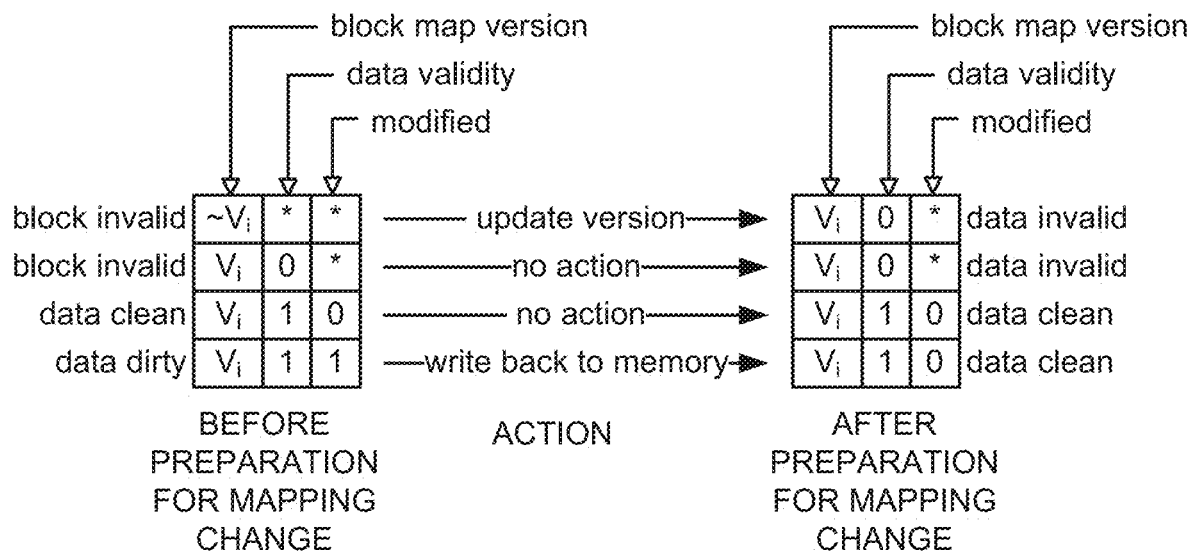
FIG. 4 summarizes actions to be taken to prepare a column of a cache for a mapping change, in accordance with various representative embodiments.

FIG. 4 summarizes actions to be taken to prepare a column (column i) of a cache for a mapping change. The current column map version is denoted as $V_i$, which may have a value 0 or 1.

Firstly, as shown in the first (top) line in FIG. 4, when the block map version is the inverse or negative of $V_i$, denoted as $\sim V_i$, the block is invalid since it is likely in the wrong location in the column. In this case, the data validity bit is set to 0 to indicate invalid data and the block map version is set to the current map version $V_i$. This action is taken whatever the initial values of the data validity bit or the "modified" bit.

When the block map version matches the current column map version, no action is taken when the data state is "invalid" or "clean," as indicated by the second and third lines in FIG. 4, respectively. These blocks will become invalid after the map changes, since the block map version will not match the new column map version. The clean data will not be lost since a matching copy is stored in the memory.

When the block map version matches the current column map version and the data state is "dirty," as depicted by the last line in FIG. 4, the data is written back to the memory at the base address indicated by the address tag. The data state is then updated to "clean," since the data in the cache matches the data in the memory.

These actions ensure that no data is lost when the map change is made and the whole column becomes invalid.

Figure 5:
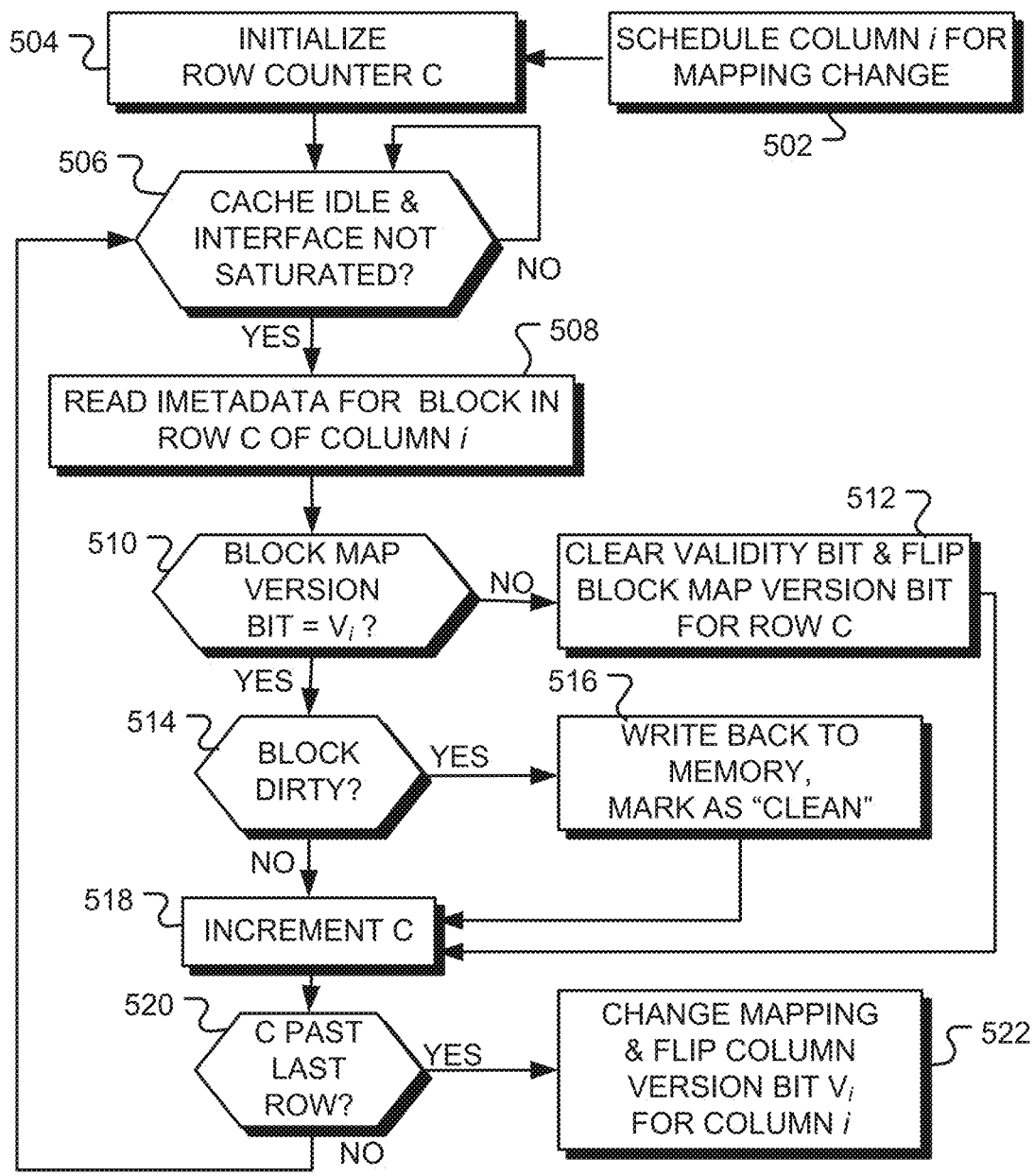
FIG. 5 is a flow chart of a method for changing an address-to-row mapping for a column of skewed-associative cache, in accordance with various representative embodiments.

FIG. 5 is a flow chart of a method 500 for changing the mapping for a column of skewed-associative cache, in accordance with embodiments of the disclosure. The designated column, column i in this example, is scheduled at block 502. The mapping change may be performed, for example, periodically, after a specified number of instructions have been executed, after a specified number of accesses to the column or the cache, at random times, in response to a user instruction, or at some other time. A row counter is initiated at bock 504 to track which row is being prepared for a mapping change. Preparation for a mapping change occurs in a time period referred to as the "preparation time period." The preparation may be performed at a lower priority than accesses to cache, so that system performance is not negatively impacted. In addition, since "dirty" data will be written back to the memory, preparation may be paused while the interface to the memory is saturated. Thus, as illustrated by the positive branch from decision block 506, preparation only continues when the cache is idle and the interface is not saturated.

For each block of column i, metadata for the block, including the block map version and an indication of a state of data stored in the block, are read at block 508. As described above, the data state is "invalid" when the data in not valid, "clean" when the data in the block is valid and matches corresponding data in the memory, and "dirty" when the data in the block is valid but the data was written by a processor and has not yet been written back to the memory. When the block map version of the block does not match a column map version ($V_i$) of the current mapping value for column i, as depicted by the negative branch from decision block 510, the metadata of the block is updated so that the block map version matches the column map version and the data state is "invalid." This may be done, at block 512, by clearing the data validity bit and flipping the block map version bit for the current row. When the block map version of the block matches the column map version and the data state is "dirty," as depicted by the positive branch from decision block 514, data in the block is written back to the memory at block 516 and the metadata of the block is updated to indicate a "clean" state. Marking the data as "clean" allows the block to be used by a processor while the remainder of the column is being prepared for the mapping change. When the block map version of the block matches the column map version and the data state is "clean" or "invalid," no action is required.

The row counter is incremented at block 518. If more rows in column i are to be prepared, as depicted by the negative branch from decision block 520, flow returns to decision block 506. The preparation time period ends when all rows of column i have been prepared for mapping change, as depicted by the positive branch from decision block 520. Subsequent to the preparation time period, the address-to-row mapping for column i is changed, at block 522. The column map version for column i is also changed by flipping the column version bit, Vi. The mapping change for the column is then complete. Flipping the column version bit, Vi causes all blocks in the column to become invalid.

Figure 6:
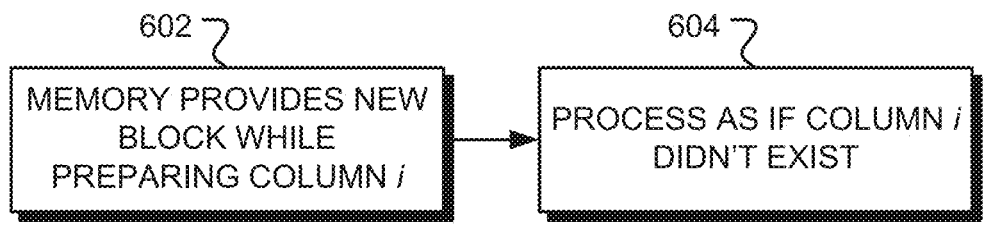
FIG. 6 is a flow chart of a method for handling memory requests to a cache while data in a column of the cache is being prepared for mapping change, in accordance with various representative embodiments.

In accordance with an embodiment of the disclosure, new data provided by the memory is not stored in the column of the cache while the column is being prepared for mapping change, i.e., during the first time period. This is illustrated in the flow chart 600 of FIG. 6. At block 602, the memory provides a new block of data to the cache while column i is being prepared for a mapping change. The data may be provided as result of a cache miss, for example. At block 604, the cache controller processes the data as if column i didn't exist. That is, address-to-row mappings are produced for columns other than column i, and the block is stored at a block in a column other than column i. This approach is advantageous, since data stored in column i during the first time period will become invalid once the mapping is changed, whereas as data in other columns may be available for a longer time period.

In accordance with an embodiment of the disclosure, processor access to the column of the cache is permitted during the preparation time period while the column is being prepared for a mapping change. This is advantageous since the column may contain valid data needed by a processor. If processor access were blocked during the preparation time period, the data would have to be reloaded from memory, resulting in a delay and consuming interface resources. Further, data correctness may be affected if the column contains "dirty" data.

When an address A is requested, all the mappings $F_0(A), \ldots, F_{W-1}(A)$ are calculated. If the requested block is found in column i while column i is being prepared for a mapping change, the following actions are performed to ensure that $F_i(A)$ in column A is not dirty when the mapping changes. The actions depend on the type of request (read or write) and the state of the block at row $F_i$ (A) in column i.

If one of the other blocks ($F_j$(A) in column j, say) is not valid, the block at $F_i$(A) is moved to column j and the request is serviced.

If the block in column i would become dirty after normal processing of the request (that is the block is already dirty or the cache services a write request), and one of the other blocks ($F_j$(A) in column j, say) is clean, then column j is used to service the request.

If the block in column i would become dirty after the request if the data were not written back to memory and all of the other blocks are dirty, a column j is selected at random, the block in column j is written back to memory and the block in column i is moved to the block at row $F_j$(A) in column j. Column j is then used to service the request.

Alternatively, the request may be served using column i. The new data is stored in column i and written back to memory and the block in column i is marked as clean.

As described above, if the cache is idle and the memory interface is not saturated, the cache controller continues to prepare the column of the mapping change. Information about block C in column i is read. If its map version bit is not equal to the column map version $V_i$, its validity bit is cleared and its column map version bit is flipped. This ensures that an invalid block remains invalid after the map change and ensures that its map version bit is equal to $V_i$. If it is a dirty block, the block is written back to memory and marked as clean. The row counter is then incremented. If the row counter passes the last row, the mapping in column i is changed ($F_i$ is replaced with $F'_i$) and $V_i$ is flipped (since map version bits of all blocks in column i are now not equal to Vi, all the blocks in the column become invalid).

Figure 7:
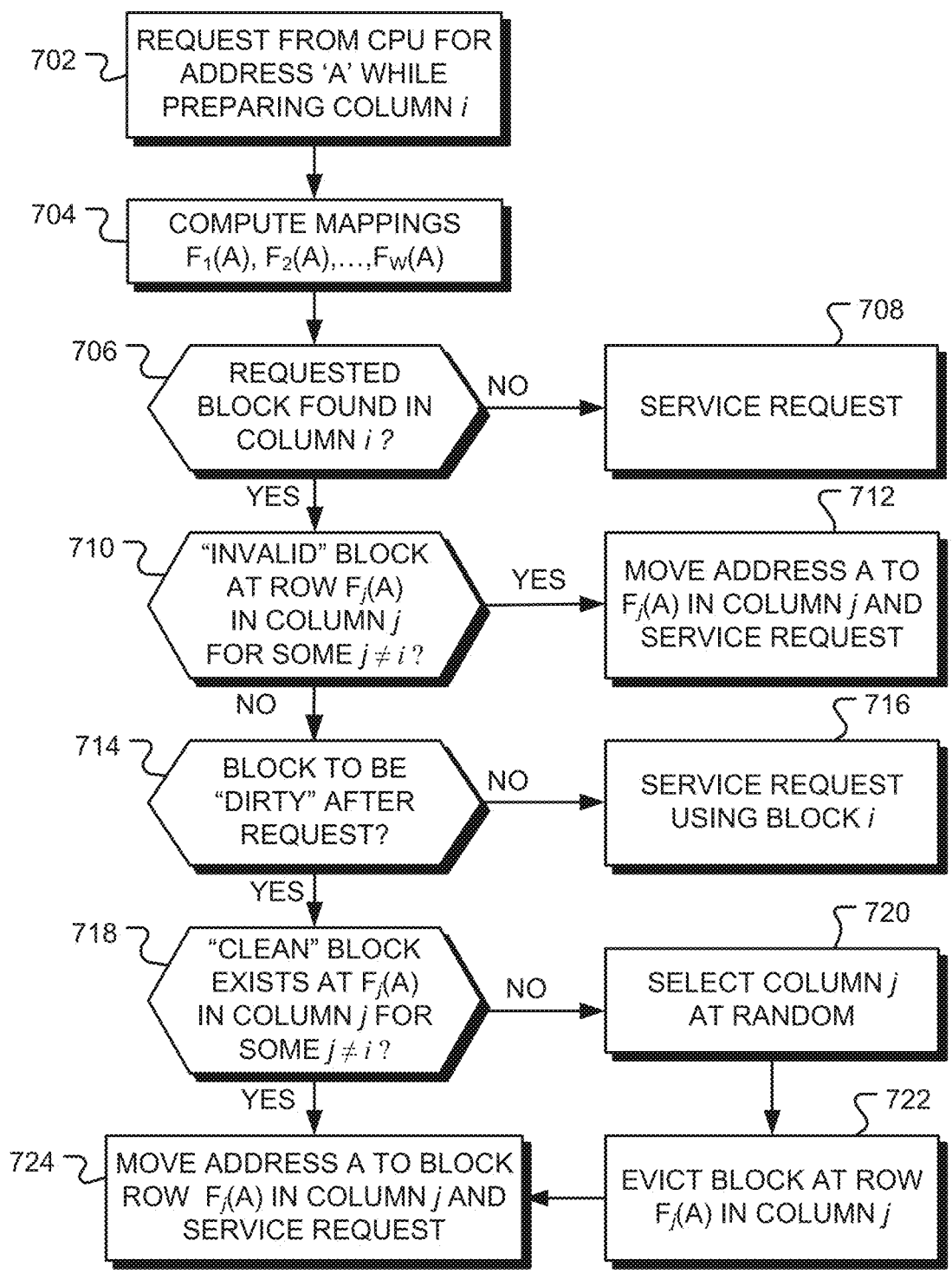
FIG. 7 is a flow chart of a method for handling processor requests to a cache while data in a column of the cache is being prepared for mapping change, in accordance with various representative embodiments.

FIG. 7 is a flow chart of a method for handling a processor request to a cache while data in column i of the cache is being prepared for a mapping change, in accordance with various embodiments. At block 702, a request is received from a processor of the data processing system, during the preparation time period, to access data associated with an address A in the memory. At block 704 a set of blocks, including one block in each column of the cache, is determined dependent upon the address A and the map value of each column. The blocks are located at rows $F_0$(A), $F_1$(A), ..., $F_{W-1}$(A) in columns 0, 1, ..., W-1, respectively. If the data associated with address A is not found in column i, the column being prepared for mapping change, as depicted by the negative branch from decision block 706, the request is serviced as normal at block 708.

If, as depicted by the positive branch from decision block 706, the data associated with address A is found in a first block located at row $F_i$(A) in column i, the request is processed in a different manner and flow continues to decision block 710.

Firstly, as depicted by the positive branch from decision block 710, if a second block in the block set for address A, located in another column (column j, say), is invalid, the first block is moved to the second block (located at row $F_j$(A) in column j, where $F_j$(A) denotes the address-to-row mapping for column j). The request is then serviced using the second block and the data state for the first block is updated to be "invalid." If the block set for address A contains no invalid blocks, flow continues to decision block 714, as depicted by the negative branch from decision block 710.

If the data associated with address A will not become "dirty" after the processor request is serviced, as depicted by the negative branch from decision block 714, the request is serviced at block 716 using column i. However, if the data associated with address A will be "dirty" after the processor request has been serviced, as depicted by the positive branch from decision block 714, the block must be moved to a different column. Since there are no columns with an invalid block in the block set for address A (otherwise the block would have been moved at 712), it is more efficient to replace a "clean" block rather than a "dirty" block. This is because a "dirty" block would need to be written back to memory, consuming system resources. As depicted by the positive branch from decision block 718, if a "clean" block is located at row $F_j$(A) in some column j, the block associated with address A is moved to row $F_j$(A) in column j at block 720 and the request is serviced using column j. As depicted by the negative branch from decision block 718, if there is no "clean" block in the set, the request can be moved to any other column. The column is selected at block 722. The column may be selected at random, for example. The existing "dirty" block in column j is evicted and written back to memory at block 724. At block 720, the block associated with address A is moved to row $F_j$(A) in column j. This approach avoids the data state of a block being changed to "dirty" by a processor request after the block has been prepared for a mapping change but before the actual mapping change occurs.

Figure 8:
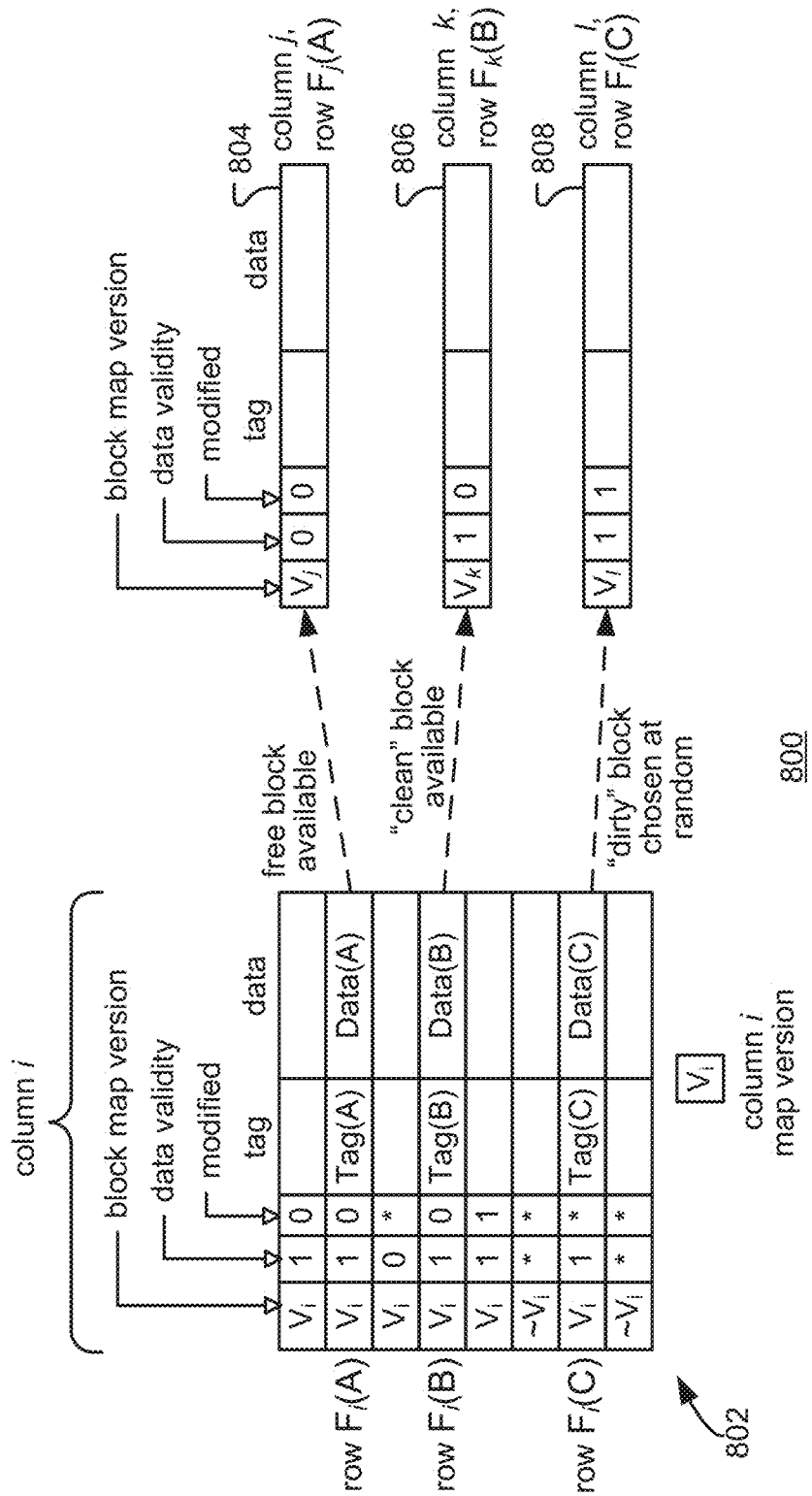
FIG. 8 is a block diagram of a portion of a skewed-associative cache prior to processing requests from a processor, in accordance with various representative embodiments.

FIG. 8 is a block diagram of a portion of a skewed-associative cache 800 in accordance with representative embodiments. FIG. 8 shows selected contents of the cache during a preparation time period for column i. At this time, part way through the preparation, blocks in the first four rows of column i (802) have been prepared (and so are clean or invalid, but not dirty), while blocks in the last four rows have not.

If a request to access address A is received from a processor, the block set for address A is determined and the block set is searched for a matching address tag. In the example shown in FIG. 8, a matching address tag is found in column i at row $F_i$(A). In addition, an invalid block 804, also in the block set for address A, is found in column j at row $F_j$(A). Thus, the block in row $F_i$(A) may be moved to block 804.

If a request to modify data associated with address B is received from a processor, the block set for address B is determined and the block set is searched for a matching address tag. In the example shown in FIG. 8, a matching address tag is found in column i at row $F_i$(B). In this example, none of the blocks in the block set for address B is invalid. However, a "clean" block 806, also in the block set for address B, is found in column k at row $F_k$(B). Thus, the block in row $F_i$(B) may be moved to block 806. Since the data previously in block 806 is "clean," it may be evicted without having to be written back to memory.

If a request to modify data associated with address C is received from a processor, the block set for address C is determined and the block set is searched for a matching address tag. In the example shown in FIG. 8, a matching address tag is found in column i at row $F_i$(C). In this example, all of the blocks in the block set for address C are "dirty." That is, none of the blocks is invalid and none of the blocks is "clean." In this case, the block in row $F_i$(C) is moved to a dirty block 808 in the block set, located at row $F_l$(C) in column 1. Since the data previously in block 806 is "dirty," it is written back to memory before the data in column i is moved or the modified data written.

Figure 9:
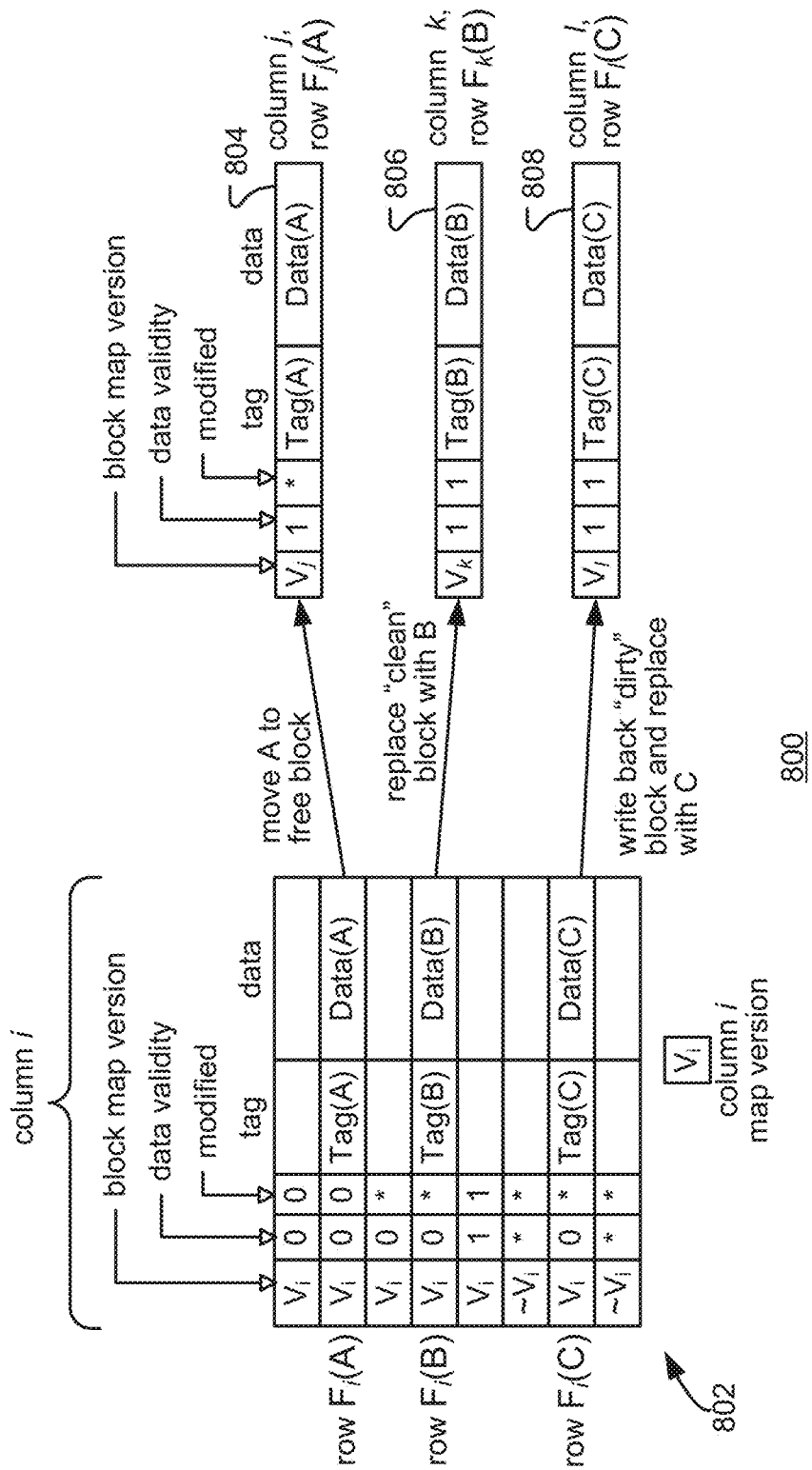
FIG. 9 is a block diagram of a portion of a skewed-associative cache after processing requests from a processor, in accordance with various representative embodiments.

FIG. 9 shows the contents of the cache 800 after the requests to access data associated with addresses A, B and C have been processed. In column i (802), rows $F_i(A)$, $F_i(B)$, and $F_i(C)$ have been marked as invalid, since the blocks have all been moved. The block 804 in row $F_j(A)$ is marked as valid, with the current map version. The block may be modified or not depending upon the type of access request. Since the requests for addresses B and C were modifying requests, the block 806 in row $F_k(B)$ of column k and the block in row $F_l(C)$ of column l are marked as "dirty" (valid and modified). Blocks 806 and 808 are marked with the current map version. In this manner, processor requests for data in column i may continue to be processed while column i is being prepared for a map change.

The embodiments described herein are combinable.

In one embodiment, a method includes initializing an address-to-row mapping for each column of a skewed-associative cache of a data processing system, the cache including a plurality of blocks referenced as a plurality of columns each having a plurality of rows; initializing a column map version for each column of the cache; determining a block set for an address in a memory of the data processing system, the block set including one block in each column of the cache, where a row location of a block in a column is determined dependent upon the address and the address-to-row mapping for the column; storing data associated with the address in a selected block of the block set, the selected block located in a column c of the cache; updating metadata for the selected block to include the column map version of column c as a block map version for the selected block, where a block of the cache is determined to be invalid if the block map version does not match the column map version; changing the address-to-row mapping for designated column, column i, of the cache, including, in a preparation time period, for each block of column I, reading metadata for the block, including the block map version and an indication of a data state stored in the block, where the data state is "invalid" when the data in the block is not valid, "clean" when the data in the block is valid and matches corresponding data in the memory, and "dirty" when the data in the block is valid but was written to the cache by a processor of the data processing system and has not been written back to the memory, if the block map version of the block does not match a column map version for column i, updating the metadata of the block such that the block map version matches the column map version and the data state is "invalid," and if the block map version of the block matches the column map version and the data state is "dirty," writing data in the block to the memory and updating the block map version to match the column map version of column i and updating the data state to "clean"; and subsequent to the preparation time period, changing the address-to-row mapping for column i and updating the column map version for column i.

In another embodiment of the method, the method further includes, in the preparation time period, determining a block of the cache to be invalid if the data state of the block is "invalid" or the block map version does not match the column map version; and responsive to a request by a processor of the data processing system to access data in a block of column i, the data associated with an address A in the memory, if at least one other block in the block set of address A is invalid, moving the block in column i to an invalid block in the block set, the invalid block located in column j; marking the block in column i as invalid; and servicing the request from column j.

In another embodiment of the method, the method further includes if no other block in the same block set as the block in column i is invalid and the data accessed will not be "dirty" after the request is serviced, servicing the request from column i.

In another embodiment of the method, the method further includes, if no other block in the block set of address A is invalid and the data will be "dirty" after the request is serviced, if at least one block in the block set of address A is "clean," evicting data in a "clean" block in the block set, located in column j, and if no other block in the block set of address A is "clean," writing data in a "dirty" block in the block set, located in column j, back to memory; moving the block in column i to the block in the block set located in column j; marking the block in column i as invalid; and servicing the request from column j.

In another embodiment of the method, the method further includes if no other block in the block set of address A is invalid and the data accessed will be "dirty" after the request is serviced and no block in the block set of address A is "clean," selecting column j at random.

In another embodiment of the method, the method further includes if no other block in the block set of address A is invalid and the data accessed would be "dirty" if the request were serviced normally and no block in the block set of address A is "clean," servicing the request from column i, writing the data accessed to the memory and marking the block as "clean."

In another embodiment of the method, the method further includes responsive to receiving data from a memory of the data processing system in the preparation time period, storing the data in a block in a column other than column i.

In another embodiment of the method, the column map version is stored as a single binary digit and updating the column map version includes flipping the single binary digit.

In another embodiment of the method, the address-to-row mapping for column i and address A is dependent upon a key value for column i, and where changing the mapping for column i includes changing the key value for column i.

In one embodiment, a system includes a memory, a processor and one or more caches operatively coupled to the memory and the processor. The one or more caches including a skewed-associative cache including a plurality of storage blocks, referenced as a plurality of rows and plurality of columns, in which a storage block of the plurality of storage blocks is configured to store data and metadata, the data associated with an address in the memory, the metadata including a block map version, a data state and an address tag of the address, and a cache controller configured to store a column map version for each column of the cache; determine a block set for an address in the memory, the block set including one block in each column of the cache, the location of which is dependent upon an address-to-row mapping for the column; store data associated with the address in a selected block of the block set, the selected block located in column c; update the metadata for the block in column c to include the column map version of the selected column as the block map version; and determine a block of the cache to be invalid if the data state of the block is "invalid" or the block map version does not match the column map version. The cache controller is further configured to update the address-to-row mapping for a column while the column is in use.

In another embodiment of the system, the cache controller is further configured to, in a preparation time period, prepare a first column of the cache, column i, for a change to the address-to-row mapping for column i, including, for each block of column i, read metadata for the block, including the block map version and an indication of a data state stored in the block, if the block map version of the block does not match a column map version for column i, update the metadata of the block such that the block map version matches the column map version and the data state is "invalid," and if the block map version matches the column map version and the data state is "dirty," write data in the block to the memory and update the metadata of the block to indicate the column map version and a "clean" state; and subsequent to the preparation time period, change the address-to-row mapping for column i and update the column map version for column i.

In another embodiment of the system, the cache controller is further configured to, responsive to a request, received in the preparation time period, from a processor of the data processing system to access data associated with an address A and located in a block of column i, move the block in column i to an invalid block in a block set of address A, the invalid block located in column j, if at least one other block in the block set of address A is invalid; mark the block in column i as invalid; and service the request from column j.

In another embodiment of the system, the cache controller is further configured to service the request from column i if no other block in the block set of address A is invalid and the data accessed will not be "dirty" after the request is serviced.

In another embodiment of the system, the cache controller is further configured to, if no other block in the block set of address A is invalid and the data accessed will be "dirty" after the request is serviced, evict data in a "clean" block in the block set, located in column j if at least one block in the block set of address A is "clean;" and write data in a "dirty" block in the block set, located in column j, back to memory if no other block in the block set of address A is "clean;" move the block in column i to the block in the block set located in column j; mark the block in column i as invalid; and service the request from column j.

In another embodiment of the system, the cache controller is further configured to select column j at random if no other block in the block set of address A is invalid, the data accessed will be "dirty" after the request is serviced, and no block in the same block set of address A is "clean."

In another embodiment of the system, the cache controller is further configured to service the request from column i, write the data accessed to the memory and mark the block as "clean" if no other block in the block set of address A is invalid, the data accessed would be "dirty" if the data were not written to the memory, and no block in the block set of address A is "clean."

In another embodiment of the system, the cache controller is further configured to store data in a block in a column other than column i when the data is received from the memory during the preparation time period.

In this document, relational terms such as first and second, top and bottom, and the like, may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that it has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM), non-volatile memory (NVM), mass storage such as a hard disc drive, floppy disc drive, optical disc drive, optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium.

A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method comprising:
    initializing an address-to-row mapping for each column of a skewed-associative cache of a data processing system, the cache including a plurality of blocks referenced as a plurality of columns each having a plurality of rows;
    initializing a column map version for each column of the cache;
    determining a block set for an address in a memory of the data processing system, the block set including one block in each column of the cache, where a row location of a block in a column is determined dependent upon the address and the address-to-row mapping for the column;
    storing data associated with the address in a selected block of the block set, the selected block located in a column c of the cache;
    updating metadata for the selected block to include the column map version of column c as a block map version for the selected block, where a block of the cache is determined to be invalid if the block map version does not match the column map version;
    changing the address-to-row mapping for designated column, column i, of the cache, including:
        in a preparation time period:
            for each block of column i:
                reading metadata for the block, including the block map version and an indication of a data state stored in the block, where the data state is "invalid" when the data in the block is not valid, "clean" when the data in the block is valid and matches corresponding data in the memory, and "dirty" when the data in the block is valid but was written to the cache by a processor of the data processing system and has not been written back to the memory,
                if the block map version of the block does not match a column map version for column i, updating the metadata of the block such that the block map version matches the column map version and the data state is "invalid," and
                if the block map version of the block matches the column map version and the data state is "dirty," writing data in the block to the memory and updating the block map version to match the column map version of column i and updating the data state to "clean"; and
        subsequent to the preparation time period, changing the address-to-row mapping for column i and updating the column map version for column i.

2. The method of claim 1, further comprising:
    in the preparation time period:
        determining a block of the cache to be invalid if the data state of the block is "invalid" or the block map version does not match the column map version; and
        responsive to a request by a processor of the data processing system to access data in a block of column i, the data associated with an address A in the memory:
            if at least one other block in the block set of address A is invalid, moving the block in column i to an invalid block in the block set, the invalid block located in column j;
            marking the block in column i as invalid; and
            servicing the request from column j.

3. The method of claim 2, further comprising:
    if no other block in the same block set as the block in column i is invalid and the data accessed will not be "dirty" after the request is serviced, servicing the request from column i.

4. The method of claim 2, further comprising:
    if no other block in the block set of address A is invalid and the data will be "dirty" after the request is serviced:
        if at least one block in the block set of address A is "clean," evicting data in a "clean" block in the block set, located in column j, and
        if no other block in the block set of address A is "clean," writing data in a "dirty" block in the block set, located in column j, back to memory;
    moving the block in column i to the block in the block set located in column j;
    marking the block in column i as invalid; and
    servicing the request from column j.

5. The method of claim 4, further comprising:
    if no other block in the block set of address A is invalid and the data accessed will be "dirty" after the request is serviced and no block in the block set of address A is "clean," selecting column j at random.

6. The method of claim 4, further comprising:
    if no other block in the block set of address A is invalid and the data accessed would be "dirty" if the request were serviced normally and no block in the block set of address A is "clean," servicing the request from column i, writing the data accessed to the memory and marking the block as "clean".

7. The method of claim 1, further comprising:
    responsive to receiving data from a memory of the data processing system in the preparation time period, storing the data in a block in a column other than column i.

8. The method of claim 1, where the column map version is stored as a single binary digit and updating the column map version includes flipping the single binary digit.

9. The method of claim 1, where the address-to-row mapping for column i and address A is dependent upon a key value for column i, and where changing the mapping for column i includes changing the key value for column i.

10. A data processing system comprising:
    a memory;
    a processor; and
    one or more caches operatively coupled to the memory and the processor, the one or more caches including a skewed-associative cache comprising:
        a plurality of storage blocks, referenced as a plurality of rows and plurality of columns, in which a storage block of the plurality of storage blocks is configured to store data and metadata, the data associated with an address in the memory, the metadata including a block map version, a data state and an address tag of the address, and a cache controller configured to:

store a column map version for each column of the cache;

determine a block set for an address in the memory, the block set including one block in each column of the cache, the location of which is dependent upon an address-to-row mapping for the column;

store data associated with the address in a selected block of the block set, the selected block located in column c;

update the metadata for the block in column c to include the column map version of the selected column as the block map version; and determine a block of the cache to be invalid if the data state of the block is "invalid" or the block map version does not match the column map version;

where the cache controller is further configured to update the address-to-row mapping for a column while the column is in use.

11. The data processing system of claim 10, where the cache controller is further configured to:

in a preparation time period, prepare a first column of the cache, column i, for a change to the address-to-row mapping for column i, including:

for each block of column i:

read metadata for the block, including the block map version and an indication of a data state stored in the block, if the block map version of the block does not match a column map version for column i, update the metadata of the block such that the block map version matches the column map version and the data state is "invalid," and if the block map version matches the column map version and the data state is "dirty," write data in the block to the memory and update the metadata of the block to indicate the column map version and a "clean" state; and subsequent to the preparation time period, change the address-to-row mapping for column i and update the column map version for column i.

12. The data processing system of claim 11, where the cache controller is further configured to:

responsive to a request, received in the preparation time period, from a processor of the data processing system to access data associated with an address A and located in a block of column i:

move the block in column i to an invalid block in a block set of address A, the invalid block located in column j, if at least one other block in the block set of address A is invalid;

mark the block in column i as invalid; and service the request from column j.

13. The data processing system of claim 12, where the cache controller is further configured to service the request from column i if no other block in the block set of address A is invalid and the data accessed will not be "dirty" after the request is serviced.

14. The data processing system of claim 13, where the cache controller is further configured to:

if no other block in the block set of address A is invalid and the data accessed will be "dirty" after the request is serviced:

evict data in a "clean" block in the block set, located in column j if at least one block in the block set of address A is "clean;" and write data in a "dirty" block in the block set, located in column j, back to memory if no other block in the block set of address A is "clean;"

move the block in column i to the block in the block set located in column j;

mark the block in column i as invalid; and service the request from column j.

15. The data processing system of claim 14, where the cache controller is further configured to select column j at random if:

no other block in the block set of address A is invalid, the data accessed will be "dirty" after the request is serviced, and no block in the same block set of address A is "clean".

16. The data processing system of claim 14, where the cache controller is further configured to service the request from column i, write the data accessed to the memory and mark the block as "clean" if:

no other block in the block set of address A is invalid, the data accessed would be "dirty" if the data were not written to the memory, and no block in the block set of address A is "clean".

17. The data processing system of claim 11, where the cache controller is further configured to store data in a block in a column other than column i when the data is received from the memory during the preparation time period.

* * * * *